Inventor:
Willi Gerlach
By: Spencer & Kaye
Attorneys

Inventor:
Willi Gerlach
By: Spencer & Kaye
Attorneys

United States Patent Office
3,409,811
Patented Nov. 5, 1968

3,409,811

FOUR-ZONE SEMICONDUCTOR RECTIFIER WITH SPACED REGIONS IN ONE OUTER ZONE

Willi Gerlach, Frankfurt am Main-Eschersheim, Germany, assignor to Licentia-Patentverwaltungs-G.m.b.H., Frankfurt am Main, Germany Filed Nov. 29, 1965, Ser. No. 510,333
Claims priority, application Germany, Nov. 28, 1964, L 49,404; Apr. 27, 1965, L 50,587
6 Claims. (Cl. 317—235)

ABSTRACT OF THE DISCLOSURE

A controllable semiconductor rectifier having four zones of alternately opposite conductivity types, the two outer zones carrying main electrodes and a layer adjacent one of the outer layers carrying a control electrode, the ability of the rectifier to conduct large currents at short switch-on times being improved by forming one of the outer layers so that is defines a main region on which its associated main electrode is entirely disposed and a secondary region disposed closer to the control electrode than is the main region and separated from the main region by an electrical resistance.

Figure 1:
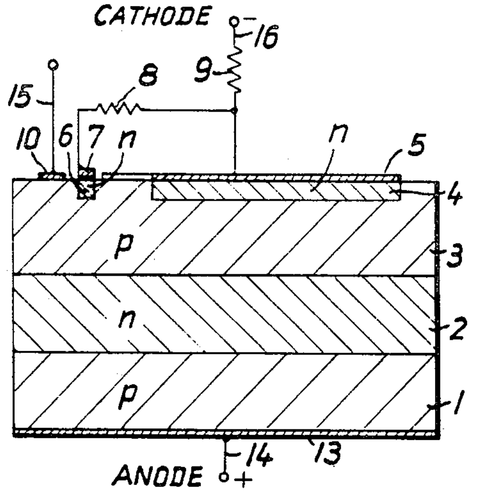

The present invention relates to a semiconductor device, and particularly to an improved controllable semiconductor rectifier.

Controllable semiconductor rectifiers find a wide range of uses in the electronic field, particularly in the case of circuit arrangements in which it is desired to obtain rapid switch-on times for switching high power loads. Such requirements are present, for example, in the case of high power inverters.

A common type of controllable semiconductor rectifier consists, for example, of a silicon disk constituted by four successive layers of alternatingly opposite types of conductivity and is provided with an anode electrode on the outer surface of one outer layer and a cathode electrode on the outer surface of the opposite outer layer. A third electrode contacting one of the two inner layers is provided as a control electrode for controlling the initiation of conduction in the rectifier. The control electrode is customarily arranged on the same side of the semiconductor disk as the cathode.

Because of the manner in which they are constructed, every known controllable semiconductor rectifier has a limited thermal load supporting capacity. Its control electrode is normally shaped to have a substantially pointed contact end and is positioned to make contact at the periphery or in the center of the cathode or anode surface in the adjacent base zone of one or both of the two ordinary transistors into which the controlable semiconductor rectifier can theoretically be divided, the coupling between these two transistors serving as the basis upon which the mode of operation of the semiconductor rectifier can be explained. When a suitable control circuit is applied to the control electrode of these devices, conduction is initiated only in a small portion of the cathode or anode surface in the region lying closest to the control electrode. In this portion, which is completely conductive, a very high energy density is created by a very rapidy increasing anode current, which density can lead, after a critical value has been exceeded, to a local melting of the semiconductor element and thus to its destruction. Arrangements have already been known which were meant to prevent such destruction by forming the control electrode of a plurality of individual control contacts and/or by giving it a special shape in order to cause a larger cathode or anode surface portion to become conductive at the first instant of conduction. However, an improvement in the switch-on load carrying capacity can be achieved by several control electrodes, or by a single control electrode shaped, for example, to surround the cathode or anode annularly, only if the switch-on time is the same for every point of the control electrode. This situation only exists, however, when the thicknesses of the zones, as well as the lifetimes of the charge carriers, are uniform throughout the device which conditions cannot be realized in practice, particularly in the case of large area controllable semiconductor rectifiers.

It is a primary object of the present invention to eliminate these drawbacks.

It is another object of the present invention to provide a controlled semiconductor rectifier capable of exhibiting very short switch-on times for conducting large currents.

It is a more specific object of the present invention to provide, that, at the beginning of the switch-on period of a controlled semiconductor rectifier, the area of the conduction sustaining portion of the main electrode adjacent the control electrode will increase rapidly.

The terms "switch-on time" or "switch-on period" are here defined as the period between the application of a conduction-initiating control current and the moment when the entire surface area of the main electrode adjacent the control electrode is conducting.

In accordance with the principles of the present invention, the desired operation is achieved by the novel construction of a controlled semiconductor device having two main electrodes constituting, respectively, a cathode electrode and anode electrode, and at least one control electrode. The device according to the present invention includes a first semiconductor zone on which at least one of the control electrodes is mounted and a first external semiconductor zone disposed on the first semiconductor zone and constituted by a main region and at least one secondary region. One of the main electrodes is entirely disposed on the main region, while the secondary region is arranged to be closer to the at least one control electrode mounted on the first semiconductor zone than is the main region. In addition, the portion of the secondary zone which is closest to the at least one control electrode is separated from the main region by an electrical resistance.

In accordance with a particular embodiment of the present invention, the secondary region is physically separated from the main region, and the electrical resistance is constituted by an external resistor connected between the main region and the secondary region.

In accordance with an alternate embodiment of the present invention, the at least one secondary region and the main region form a single body and the resistance is constituted by the inherent resistivity of the secondary zone.

In a modified version of the structure of the present invention, the semiconductor device may have five semiconductor zones and may be arranged to conduct current in either one of two directions.

In this case, both external semiconductor zones of the device are to be constructed as described above.

Additional objects and advantages of the present invention will become apparent upon consideration of the following description when taken in conjunction with the accompanying drawings in which:

FIGURE 1 is a cross-sectional, elevation view of a controlled semiconductor rectifier constituting one embodiment of the present invention.

Figure 1A:
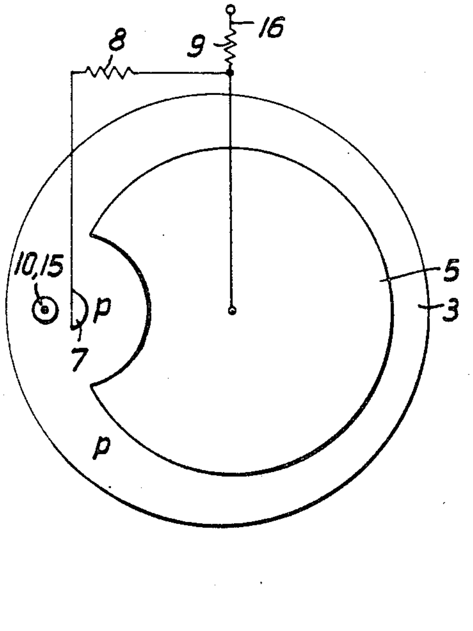

FIGURE 1*a* is a plan view of the device of FIGURE 1.

Figure 2:
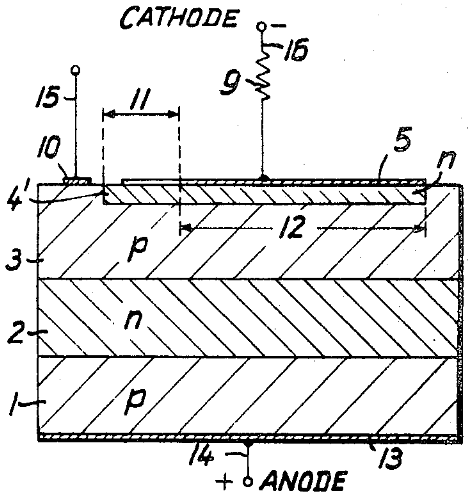

FIGURE 2 is a cross-sectional, elevation view of a second embodiment of the present invention.

Figure 2A:
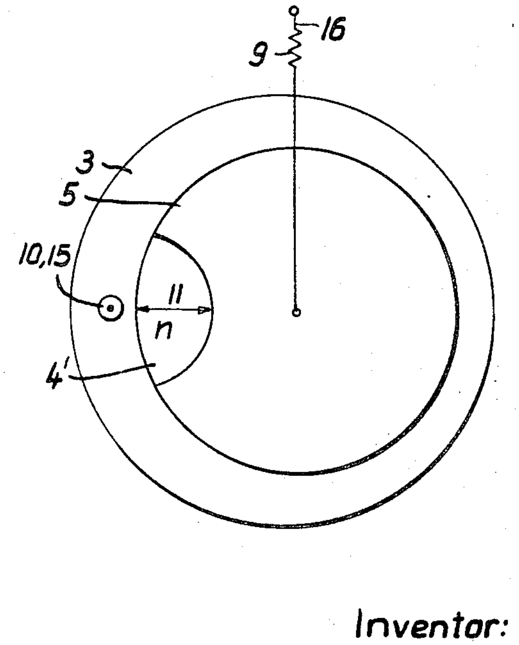

FIGURE 2*a* is a plan view of the device of FIGURE 2.

Figure 3:
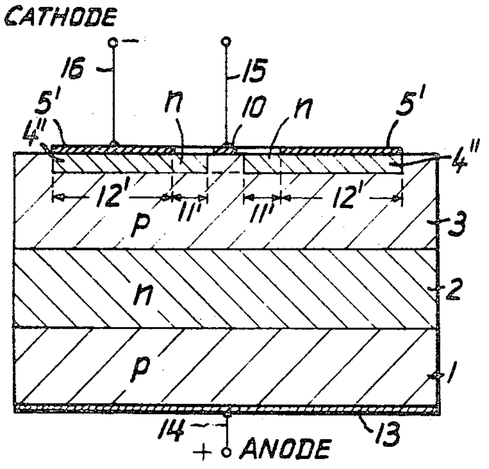

FIGURE 3 is a cross-sectional, elevation view of another embodiment of the present invention.

Figures 3A, 4A, 5:
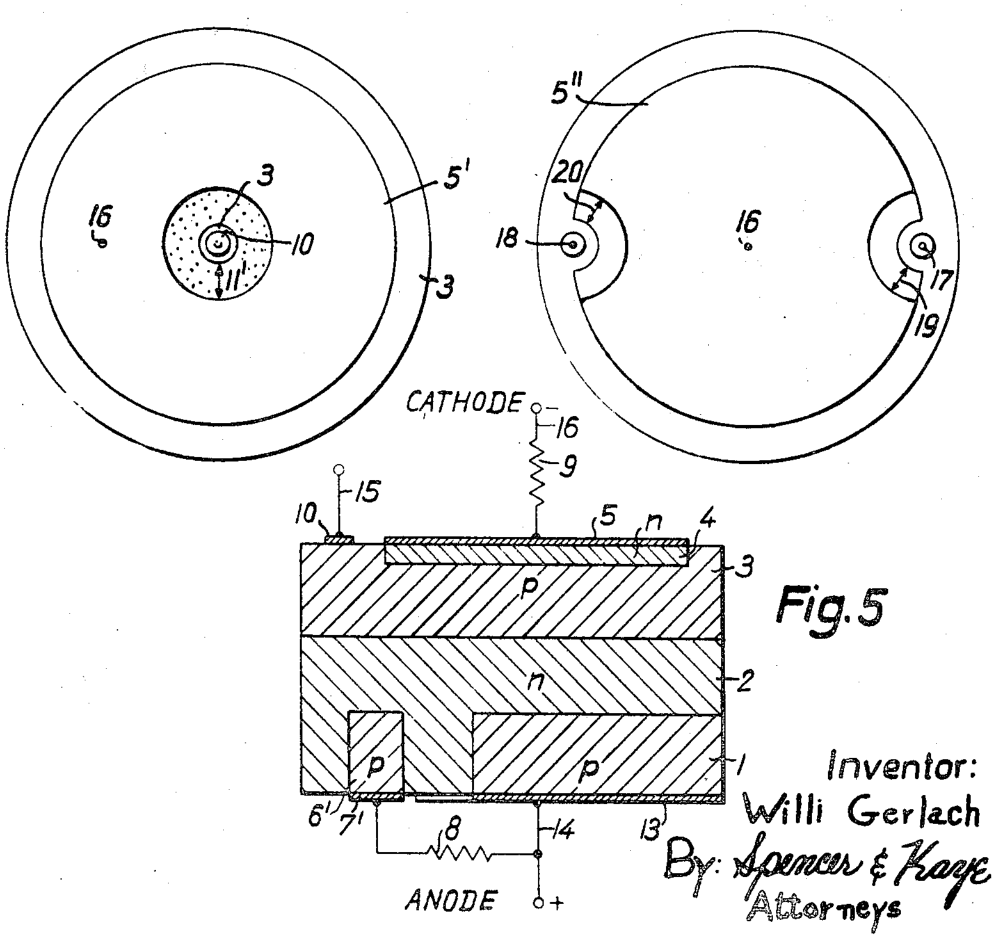

FIGURE 3*a* is a plan view of the device of FIGURE 3.

Figure 4:
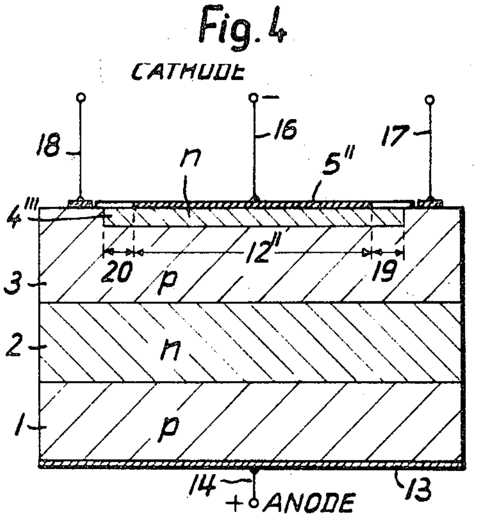

FIGURE 4 is a cross-sectional, elevation view of yet another embodiment of the present invention.

FIGURE 4*a* is a plan view of the device of FIGURE 4.

FIGURE 5 is a cross-sectional, elevation view of another embodiment of the present invention.

Referring first to FIGURES 1 and 1*a*, there is shown a controllable semiconductor rectifier having the layers 1, 2, 3 and 4 forming a pnpn-unit. On the p-conductive layer 1 there is provided a metallic layer 13 to which an anode lead 14 is connected, while the n-conductive layer 4 is provided with the metallic cathode contact layer 5 covering the entire surface of layer 4. In the p-conductive base layer 3, there is disposed, in addition to the n-conductive layer 4, a further n-conductive layer 6 to which a metallic contact 7 is connected. In the vicinity of this n-conductive layer 6, the base layer 3 is provided with a control electrode contact 10 to which is connected a control electrode lead 15. The contact 7 of the n-conductive layer 6 is connected electrically with the cathode contact 5 via a resistor 8. A load resistor 9 is connected between layer 5 and cathode lead 16 so as to be located in the main current path and its value helps to determine the magnitude of the current. The resistor 8 preferably has a resistance value which is at least of the same order as that of the load resistor 9.

In operation, when a switch-on current is applied to control contact 10, conduction is initiated in the portion of the controllable semiconductor rectifier consisting of layers 1, 2, 3 and 6. Conventional current consequently flowing from the anode 14 via the layers 1, 2, 3 and 6 and the resistor 8, to the cathode through load resistor 9, produces a voltage drop across resistor 8. This voltage drop produces an electrical field in the layer 3 between the n-conductive layers 6 and 4, layer 6 being positive with respect to layer 4. This field acts to drive the positive charge carriers which are injected from the p-conductive anode layer 1 into the p-conductive layer 3 toward the n-conductive layer 4. As a result of the action of this electric field, conduction is initiated over a path from anode 14 to the portion of the n-conductive layer 4 which is closest to the n-conductive layer 6, conduction already having commenced through this layer 6. The current flowing from the layer 6 to the layer 4 under the influence of the electric field between these layers fans out in a direction parallel to the pn-junctions between layers 1, 2 and 3 and thus causes the conduction supporting area of n-conductive layer 4 to progressively increase. Thereby, the current density in the rectifier is reduced during the switch-on period, so that the permissible $di/dt$ value for the rectifier, i.e., the so-called rate of current rise, can be considerably increased. In this connection, "*i*" denotes the total current flowing between the anode and the cathode.

An advantageous further development of the present invention is illustrated in FIGURES 2 and 2*a*. The controllable semiconductor rectifier of these figures also has a pnpn-structure constituted by the succession of layers 1, 2, 3 and 4'. The p-conductor layer 1 is provided with a metallic layer 13 carrying the anode lead 14, and the n-conductive layer 4' is provided with the metallic cathode contact layer 5 ot which the cathode lead 16 is directly connected. The layer 4' differs in configuration from the layer 4 of FIGURE 1 in that the layer 4' is perfectly circular while layer 4 was formed with a notch in the region of layer 6. The cathode contact 5 in this embodiment is identical in shape with the layer 5 of FIGURE 1 and covers only a main region 12 of the n-conductive layer 4' while leaving uncovered a secondary region 11 adjacent the control electrode contact 10 disposed on the p-conductive layer 3. The control electrode contact 10 is provided with a lead 15.

The function of the resist or 8 illustrated in FIGURE 1 is taken over in the embodiment according to FIGURES 2 and 2*a* in an advantageous manner by the transverse path resistance of the n-conductive layer 4' in the exposed secondary region 11. The transverse path resistance is defined as the resistance extending in a direction parallel to the planes defining the main electrode layers 13 and 5. In this embodiment, conduction commences through the secondary region 11 of layer 4', which region is adjacent the control electrodes, and spreads to the region 12 under the influence of the field described above in connection with the embodiment of FIGURES 1 and 1*a*, the production of which field is aided by the negative potential on layer 5. In the embodiment of FIGURES 2 and 2*a*, the secondary region 11 is physically connected to the main region 12 and differs therefrom only in that the secondary region adjacent the control electrode is not in metallic contact with the cathode or the anode layer, and in that the transverse path resistance of the secondary region in the vicinity of the control electrode forms the resistor 8 according to the invention.

In accordance with a further development of the invention, FIGURES 3 and 3*a* show a four-layer semiconductor rectifier again having the layers 1, 2 and 3 which, together with an annular layer 4'', forms a pnpn unit. On the p-conductive layer, a metallic layer 13 and an anode lead 14 are again provided, while the n-conductive layer 4'' has an annular metallic cathode layer 5' disposed thereon. Layer 5' has the same outer diameter as layer 4'', but is formed to have a larger inner diameter than layer 4'', so that the n-conductive layer 4'' consists, in this embodiment, of an exposed secondary region 11' and a main region 12' contacting layer 5'. The control electrode 10 is arranged on layer 3 centrally of the cathode 5 so as to be completely surrounded by the exposed secondary region 11'.

Upon the application of a conduction initiating current to the control electrode 10, conduction commences from anode layer 13, through the layers 1, 2, 3, to the innermost marginal zone of secondary region 11', which marginal zone is adjacent the control electrode. In this embodiment, the conduction supporting area spreads, under the influence of the electrode field described in connection with the unit of FIGURES 2 and 2*a*, to the main region 12' upon which layer 5' is disposed. The function of the resistor 8 illustrated in FIGURE 1 is taken over in the embodiment according to FIGURES 3 and 3*a* in an advantageous manner by the transverse path resistance of the secondary region 11' of layer 4''. In accordance with the principles of operation of the devices of the present invention, the anode conventional current flowing through the secondary region 11' is limited at the beginning of the switch-on period and the area of the current-carrying portion of the cathode increases progressively during the switch-on period. As a result the current density in the vicinity of the cathode is reduced during the switch-on period, so as to permit a considerable increase to be attained in the rate a which the rectifier current amplitude can safely rise.

Turning now to FIGURES 4 and 4*a*, there is shown a final embodiment of a four-layer semiconductor rectifier according to the present invention. The rectifier likewise consists of a pnpn system composed of layers 1, 2, 3 and a layer 4''' having a main region 12'' covered by a conductive layer 5'', and exposed secondary regions 19 and 20. The p-conductive layer 1 is completely contacted by the metallic layer 13 and is provided with the anode lead 14. In the marginal zone of the cathode, two control electrodes having control electrode leads 17 and 18, respectively, are provided and are each partially encircled by a respective one of the secondary regions 19 and 20. The main region 12'' forms a single, unbroken layer with the secondary regions 19 and 20.

The device of FIGURES 4 and 4*a* operates in exactly the same manner as the previously-described devices. It should be noted that the provision of two diametrically opposed control electrodes in the device of FIGURES 4 and 4*a* permits an extremely rapid switch-on time to be achieved. In particular, the provision of two control electrodes in the device of FIGURES 4 and 4*a* permits a switch-on time to be achieved which is comparable to that achived with the arrangement of FIGURES 3 and 3*a*.

In the illustrated embodiments of the present invention, conduction was initiated by the application of a control current to the base zone adjacent the cathode. The principles of the present invention can be applied equally well to the construction of a similar device in which the layer 1 and the anode layer 13 have their shapes varied and in which conduction is initiated by the application of a control current to the base zone 2 adjacent the anode.

It may thus be seen that the present invention permits the construction of a controlled semiconductor rectifier whose control electrodes may have other than a pointed or annular shape and may be positioned either at the center or on the periphery of the cathode or anode contact.

It should be particularly appreciated that the novel structures of the present invention permit a radical increase in the rate at which the value of the current can rise without creating the danger of damaging the element.

It should also be noted that the principles of the present invention can also be applied to a five-region controlled semi-conductor rectifier which is capable of supporting a current flow in either of two directions. In this case, the two outer semi-conductor zones and the conductive layers disposed thereon will be constructed as described in connection with any one of the illustrated embodiments.

An advantageous further development of the present invention is illustrated in FIG. 5. In this arrangement the p-conductive layer 6′ has the same function as the n-conductive layer in the corresponding arrangement of FIG. 1. In operation, when a switch-on current is applied to control contact 10, conduction is first initiated in the portion of the controlled rectifier consisting of layers 6′, 2, 3 and 4. The current produces a voltage drop across resistor 8 and creates a driving electrical field between the layers 6′ and 1. The further operation is analogous to that described in connection with FIG. 1.

It may further be seen that the present invention permits the construction of a controlled semiconductor rectifier which not only can sustain a greater rate of current rise than the previously-known controlled rectifiers, but which also requires a smaller control current to begin conduction than the prior art devices.

It will be understood that the above description of the present invention is susceptible to various modifications, changes, and adaptations, and the same are intended to be comprehended within the meaning and range of equivalents of the appended claims.

What is claimed is:

1. A controlled semiconductor rectifier comprising, in combination:

(a) at least four layers of semiconductor material of alternating opposite conductivity types mounted on one another, at least one outer layer of which only partially covers the layer on which it is mounted and is constituted by a main region and at least one secondary region of the same conductivity type as said main region;

(b) two main electrodes constituting, respectively, a cathode electrode and an anode electrode, one of said main electrodes being disposed entirely on said main region of said at least one outer layer and the other of said main electrodes being disposed on the other outer layer of said at least four layers;

(c) at least one control electrode, one for each said secondary region, mounted on said layer upon which said at least one outer layer is mounted and arranged closer to its respective secondary region than to said main region;

(d) a load resistor connected in series with said one of said main electrodes; and (e) an electrical resistance connected between said main region and the portion of each said secondary region which is closest to its respective control electrode and having a resistance value of the same order of magnitude as said load resistor.

2. An arrangement as defined in claim 1 wherein said secondary region is disposed annularly about said control electrode and said main region is disposed annularly about said secondary region.

3. An arrangement as defined in claim 1 wherein said at least one secondary region and said at least one control electrode are disposed at the periphery of said main region.

4. An arrangement as defined in claim 3 wherein the device has two control electrodes and in which said at least one secondary region comprises two secondary regions each arranged to partially surround a respective one of said control electrodes.

5. A controlled semiconductor rectifier device comprising, in combination:

(a) at least four semiconductor zones of alternating opposite conductivity types disposed on one another to define a pn-junction between each adjacent pair of zones, two of said zones being outer zones and at least one of said outer zones being constituted by a main region and at least one secondary region physically separated from and noncontiguous with said main region and having the same conductivity type as said main region;

(b) two main electrodes each electrically connected to a respective outer zone, with that main electrode which is connected to said at least one outer zone being disposed entirely on said main region thereof;

(c) at least one control electrode electrically connected to one of said zones which is not an outer zone and physically positioned closer to said secondary region than to said main region of said at least one outer zone; and (d) an external resistor electrically connected between said main region and said secondary region.

6. An arrangement as defined in claim 5 wherein said control electrode is connected to that one of said zones which is not an outer zone and which is located furthest from said at least one zone.

References Cited

UNITED STATES PATENTS

| | | | |
|---|---|---|---|
| 3,026,424 | 3/1962 | Pomerantz | 307—88.5 |
| 3,113,220 | 12/1963 | Goulding et al. | 307—88.5 |
| 3,151,254 | 9/1964 | Feissel | 307—88.5 |
| 3,327,183 | 6/1967 | Greenberg et al. | 317—235 |
| 3,344,323 | 9/1967 | Einthoven et al. | 317—235 |

JAMES D. KALLAM, *Primary Examiner.*